United States Patent Office 3,233,335
Patented Feb. 8, 1966

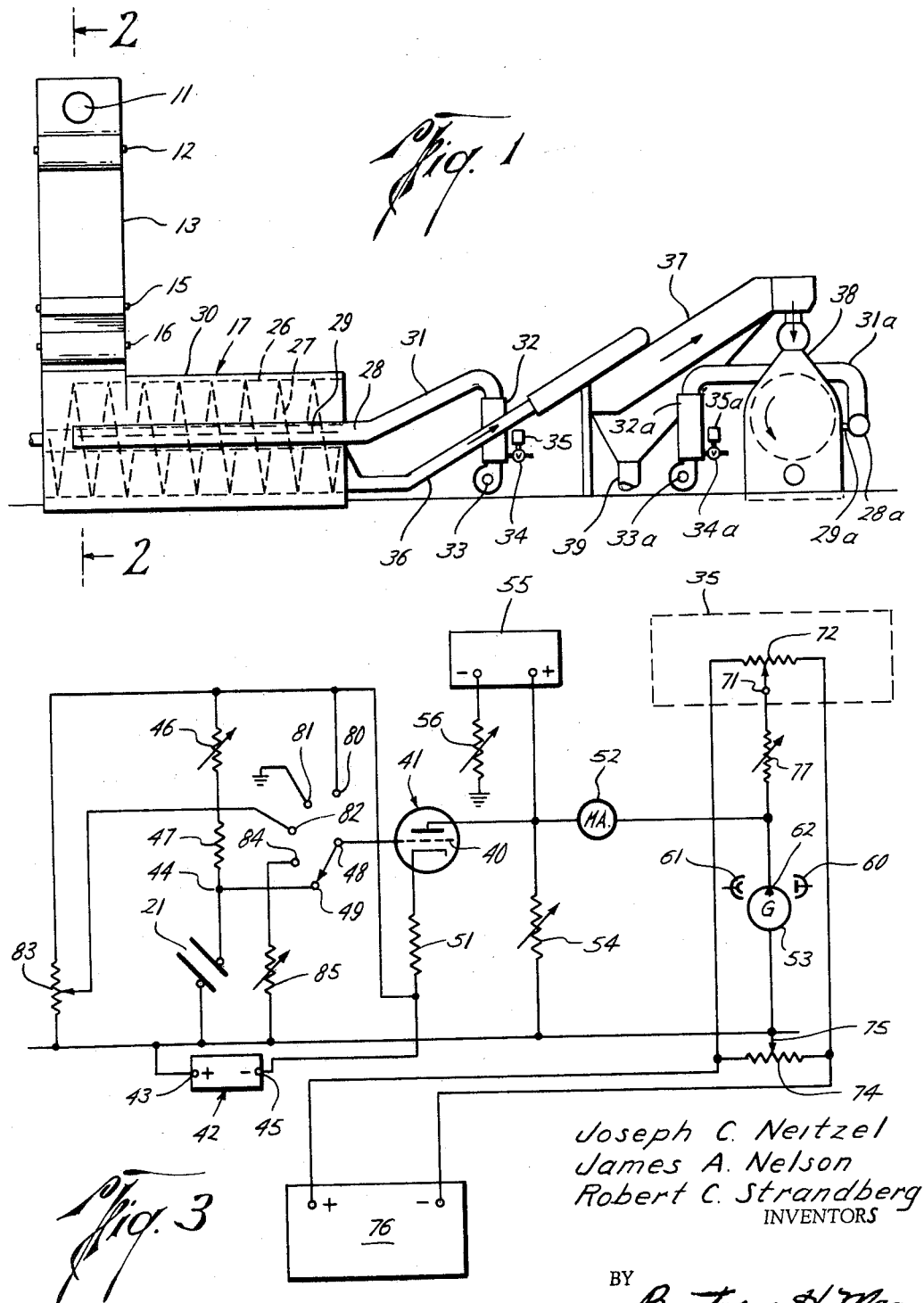

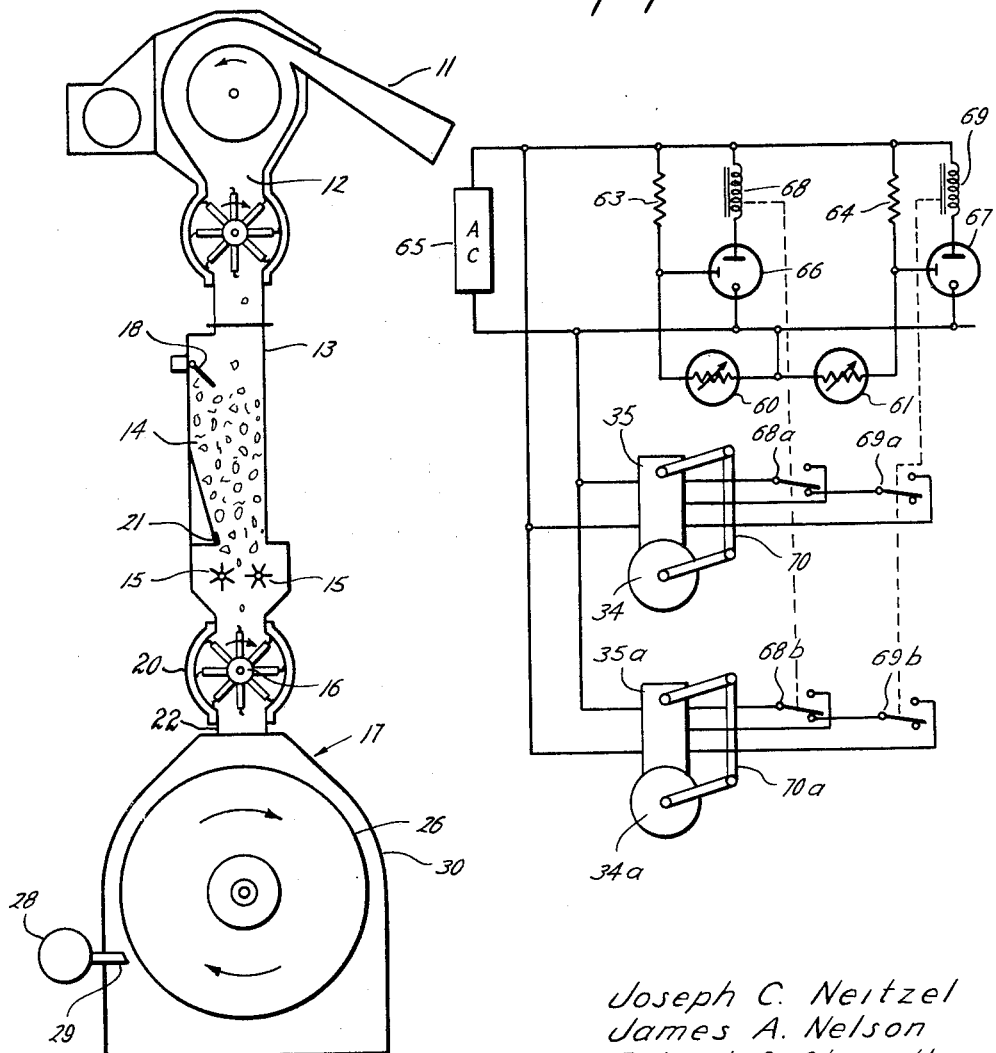

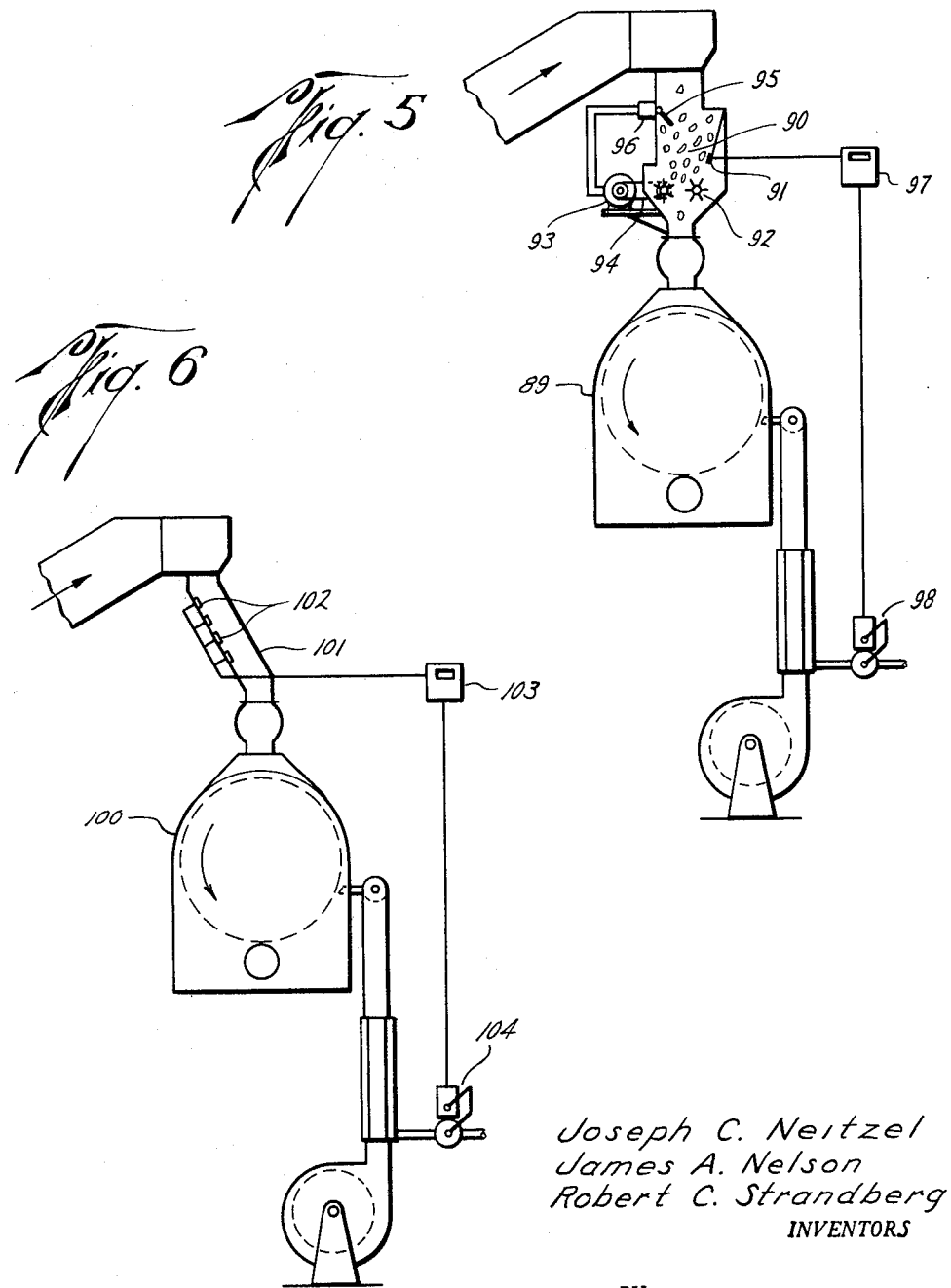

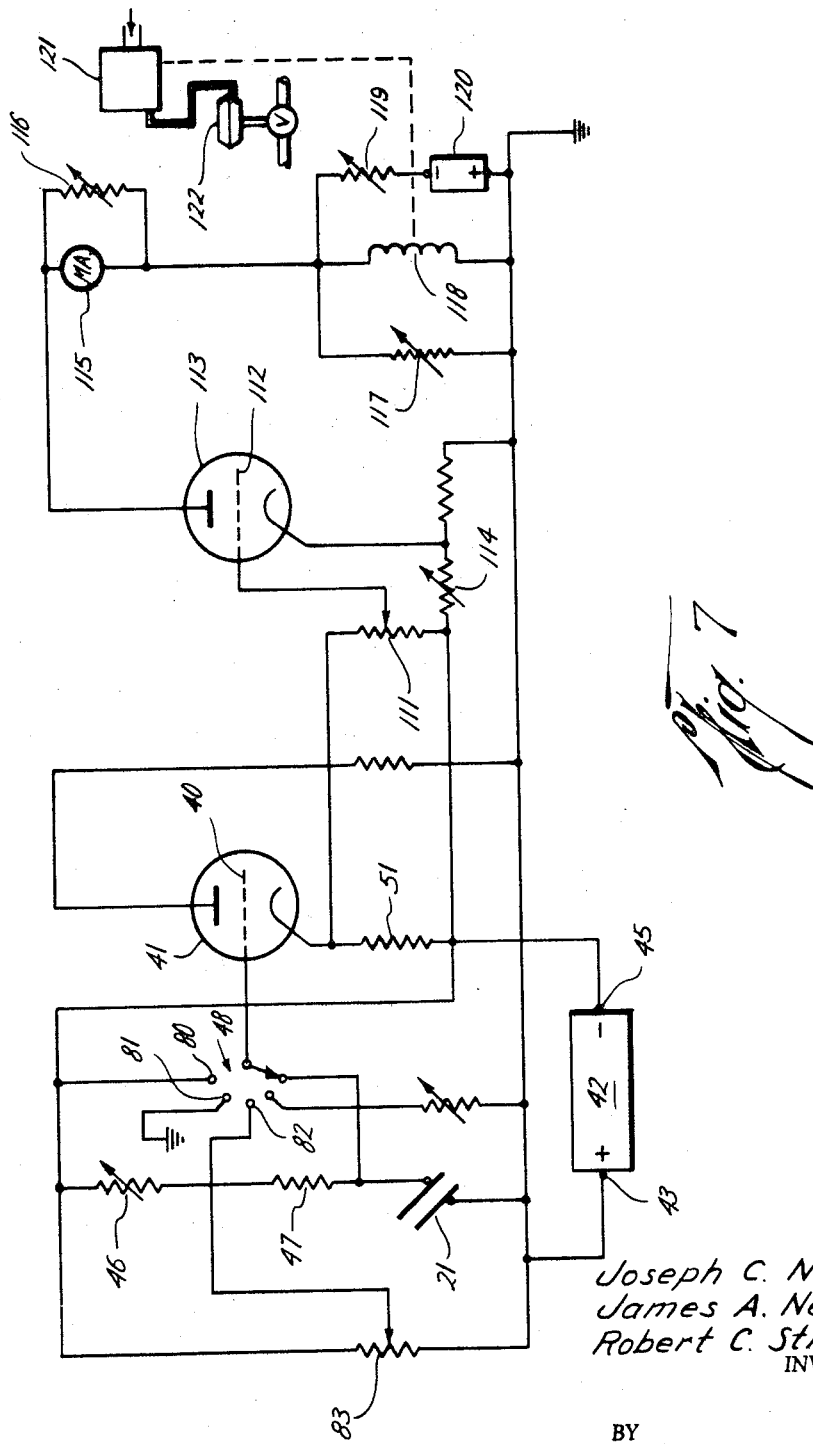

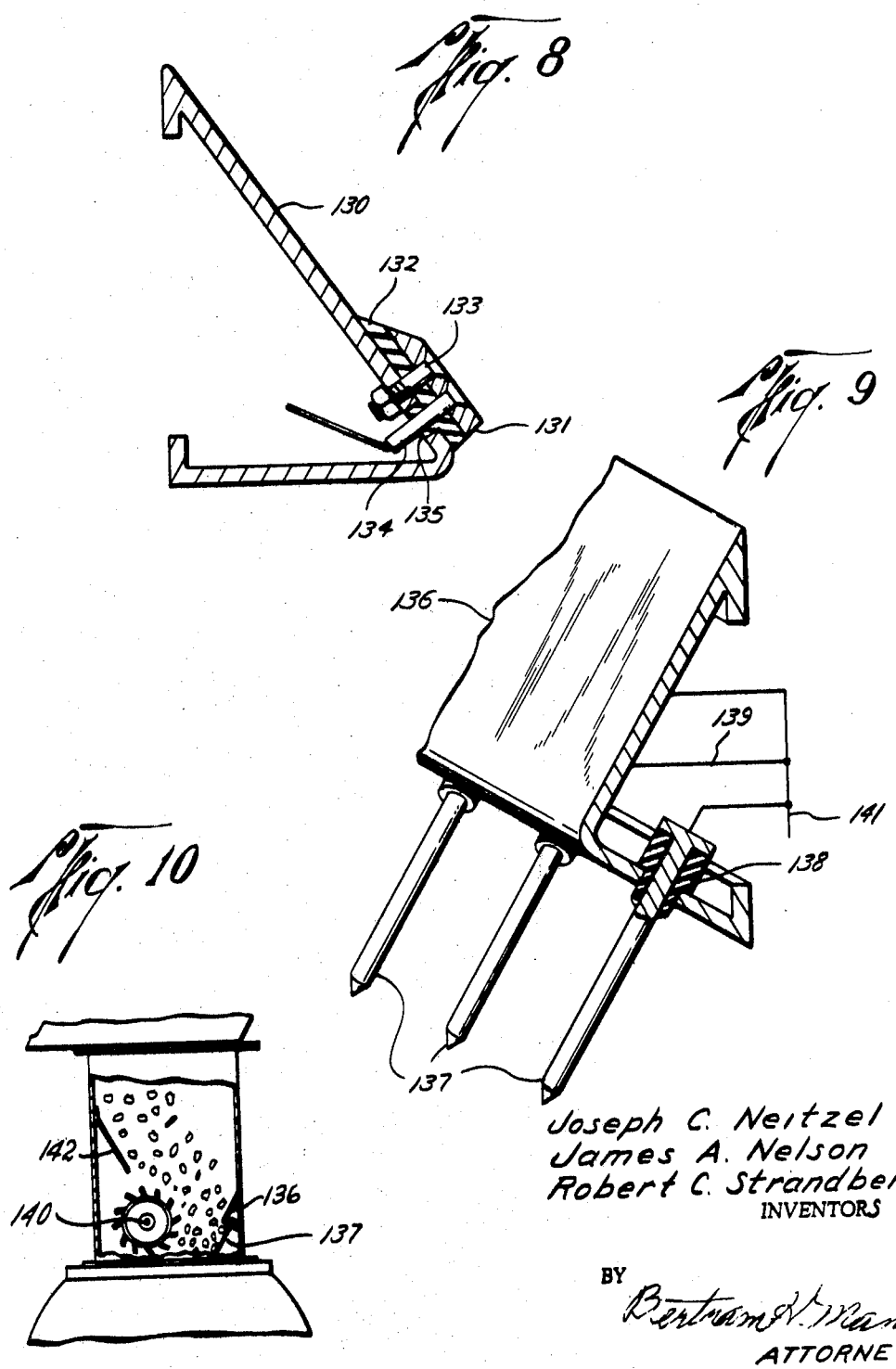

3,233,335
MATERIAL DRYING APPARATUS
Joseph C. Neitzel and James A. Nelson, Dallas, Tex., and Robert C. Strandberg, Greensboro, N.C., assignors to The Murray Company of Texas, Inc., Dallas, Tex., a corporation of Delaware
Filed Oct. 31, 1962, Ser. No. 235,179
5 Claims. (Cl. 34—48)

This is a continuation-in-part of application Serial No. 150,595, filed November 6, 1961, now abandoned.

Our present invention relates to drying apparatus which measures the moisture content of the material in process, continuously converts such measurement into positive adjustments of heat supply means, and communicates the heat resulting therefrom to the material so as to reduce the moisture content as desired.

Our invention has particular utility in reducing the moisture content of seed cotton in a gin plant, and it is presented herein such environment. However, it is to be understood that the principles thereof are readily applicable to the drying of other types of material.

In the art of processing seed cotton in a gin plant, it is desirable to accomplish certain operations before undertaking the actual ginning or stripping of the fibers from the seed. It is known that the ginning is most efficiently performed on seed cotton which is free of foreign matter and free of excessive moisture, and thus a conventional gin plant includes one or more driers and one or more cleaners through which the seed cotton is directed early in its processing.

Proper drying is important in ginning because the value of the cotton fibers is related to the staple length, and excessive heat during drying tends to shorten the staple. On the other hand, insufficient drying renders the cleaning operation less efficient, and improperly cleaned cotton also suffers a reduction in value. Experience has indicated that the optimum moisture content of cotton at the time of delivery to the ginning equipment for maximum staple and most effective cleaning and ginning is approximately 6% by weight, i.e., six pounds of water in 100 pounds of seed cotton.

It has been the practice for the gin plant operator to inspect the seed cotton in its delivered condition and to determine, either through an estimate based on its feel and appearance or a reading made with a small moisture meter, the amount of heat which must be supplied for drying. Based on this initial inspection, an appropriate setting of the heat supply means for the drier or driers is made, such setting usually being accomplished by a manual adjustment of the fuel supply valve which controls the rate at which a combustible fuel is supplied to the heater associated therewith.

It is obvious that the conventional method involving inspection and manual adjustment not only lacks in precision and leads to non-uniform drying, but also requires frequent attention from an operator, for the moisture content of the cotton delivered for ginning may vary over a wide range. As a practical matter, too little attention is given this phase of processing, and the value of the cotton suffers accordingly. Therefore, it is a primary object of our invention to provide an interrelated assembly of drying equipment including moisture measuring apparatus and heat supply adjusting apparatus to measure the moisture content of incoming material and instantly and automatically convert such information into an adjustment of the rate at which heat is supplied for drying.

It is a more specific object of our invention to provide apparatus to measure the moisture content of seed cotton and automatically adjust one or more fuel supply valves in accordance with such measurement.

It is also an object of our invention to provide moisture measuring apparatus which is adapted for interposition within the avenue of movement of the material in process at its point of entry to the drier to continuously reflect the moisture content thereof as a function of its electrical resistance.

It is also an object of our invention to provide a heat control system for drying equipment which will receive an electrical signal indicative of the moisture content of the material to be dried, and automatically convert such signal into a setting of the heat supply means in accordance therewith.

It is a further object of our invention to provide a control element which is adapted to receive a signal representative of the moisture content of the material to be dried and to produce a corresponding change in the rate at which fuel is supplied to a heater associated with the drying apparatus.

It is a further object of our invention to provide a control element which is readily adjustable to adapt the responses of the heating apparatus connected thereto to the varying conditions of different installations.

It is a further object of our invention to provide heat control apparatus which may be readily incorporated into existing ginning equipment without extensive alteration or modification thereof.

It is also an object of our invention to provide a heat control system including two or more heating units operated by a single control element and adapted for adjustable and proportional response thereto whereby drying can be accomplished in two or more stages.

It is also an object of our invention to provide supplementary heat control systems independent of the primary heat control system to adjust additional heat supply means for additional driers whereby moisture removal can be accomplished in multiple stages, the operation of each of which is directly correlated to the moisture content of the material at the time of its arrival at each such drier.

It is also an object of our invention to provide manual control means for the heat control system or systems to allow setting of the heat supply means at any desired position for preheating the drying equipment.

It is a further object of our invention to provide material drying apparatus of sufficient flexibility to be readily employed in the processing of all cotton fibers, whether harvested by hand-picking, machine-picking, pulling or machine stripping, and to efficiently dry a varying sequence of material harvested in different fashions.

In carrying out the foregoing objects, we provide a moisture measuring element positioned near the inlet duct of a drier unit. This element is so situated within the material handling apparatus that material moves continuously thereacross at a substantially constant rate immediately prior to its introduction into the drier. The moisture content of the material passing across the moisture measuring element is reflected by a signal, the character of which varies in accordance therewith. This signal is continuously communicated to a control element which immediately adjusts the position of the fuel supply valve of the heating apparatus so as to produce a drying temperature determined by the amount of moisture removal to be accomplished. The system has a range of response which is adjustable to meet the needs of any particular installation.

Our experience has proven that the adjustment of the fuel supply valve will produce an almost instantaneous change in the temperature of the air emanating from the heating unit, and when the moisture measurement is made immediately prior to entry of the moist material into the drier, quite accurate control can be maintained. Our invention further contemplates the use of multiple automatically-controlled driers, each of which incorporates the operating characteristics described above, to perform the drying operation in as many stages as convenient or necessary.

Our invention can be understood by the following description studied in conjunction with the attached drawings in which:

FIG. 1 is a schematic diagram of a typical cotton drying and cleaning assembly showing two reel-type driers with their associated heat supply means and gas feed valves, and a cleaner therebetween;

FIG. 2 is an enlarged section along line 2—2 of FIG. 1 showing the drier, the fed control means therefor, and the general position of the moisture measuring element;

FIG. 3 is a diagram showing the major part of the electrical control circuits which convert the moisture measurement into automatic adjustments of the fuel supply valve for the heating apparatus;

FIG. 4 is a combined electrical and schematic diagram showing the remaining portion of the electrical control circuit and the manner of operation of two fuel supply valves simultaneously controlled thereby;

FIG. 5 is a generally schematic view of a control feed unit and drier showing certain features characteristic of the second drier in an embodiment of our invention employing two independently controlled driers;

FIG. 6 is a generally schematic view similar to FIG. 5 showing an alternate arrangement of the moisture measuring element;

FIG. 7 is a combined electrical and schematic diagram showing an alternate control system intended for use in lieu of the system of FIGS. 3 and 4;

FIG. 8 is a view in section of one type of moisture measuring element suitable for use with our invention;

FIG. 9 is a fragmentary perspective view of an alternate moisture measuring element which also is suitable for use with our invention; and FIG. 10 is a generally schematic view of a control feed unit showing one installation of the measuring element of FIG. 9.

Referring first to FIGS. 1 and 2, a typical assembly of elements for cleaning and drying cotton is shown. Reference numeral 11 indicates the conduit through which the seed cotton arrives at the drying apparatus. Seed cotton conventionally is transported pneumatically, and the separator assembly indicated generally by reference numeral 12 separates the control feed unit 13 therebelow from the moving air in conduit 11. The control feed unit 13 has a material receiving or collecting chamber or duct 14 and feed means such as rollers 15 which control the rate of introduction of the cotton into the drier. An air sealing feeder 16 below the feed rollers 15 separates the control feed unit from the interior of the first drier 17.

The feed rollers 15 pass cotton to the drier at a rate commensurate with the capacity of the gin plant, and the material awaiting entry to the drier is held in the chamber or duct 14. It is considered desirable to feed slightly more cotton into the cleaning and drying system than the gins can conveniently handle, which condition lends itself to efficient utilization of all the equipment. Thus, the control feed rollers 15 are adjusted to a speed which will fulfill this requirement.

Cotton does not move continuously into feed duct 14 from separator assembly 12, but rather arrives intermittently. The vane or valve member 18 within the upper portion of duct 14 actuates an electrical switch 19 in response to variations in level of the material therein, and the switch controls the operation of the air suction system which transports the material through conduit 11. As an arrangement of this type is well known in the art and forms no part of the present invention, it is not disclosed in detail herein. We need note only that when the gin plant is in operation, there normally will be material in chamber 14 awaiting drying.

With this arrangement, the moisture measuring element designated generally by reference numeral 21 in FIG. 2 and schematically in FIG. 3 is positioned so that the material in measuring position relative thereto passes immediately therefrom into the feed rollers 15. This location is important to the successful practice of our invention, for the response of the moisture measuring element to the material in contact therewith immediately affects an adjustment of the heat supply means. When the unit is properly calibrated, the amount of heat resulting therefrom will be that necessary to reduce the moisture content of the cotton producing the measurement to a level which can be controlled within relatively narrow limits.

The structure of the moisture measuring element itself will be discussed subsequently herein, and it is sufficient to observe at this point that the seed cotton moving thereacross completes a circuit between two elements, one of which is connnected to ground. The resistance of the cotton varies inversely with its moisture content, and thus the signal resulting from a given voltage impressed across the element will be consistently representative of the moisture content.

Within the drier 17 is a revolving cylinder 26, and the seed cotton travels therethrough responsive to the rotation of the spiral baffles 27 which act as a large screw type conveyor. The surface of the cylinder 26 is formed of a mesh or grid which allows hot air from the manifold 28 to blow through and across the cylinder to dry the seed cotton as it tumbles within the cylinder. The nozzle 29 extends the full length of the manifold 28 and directs the hot air against the cylinder 26. The imperforate housing 30 of the drier serves as a thermal jacket to confine the hot air therewithin, and foreign material which may be present in the seed cotton falls through the apertures and comes to rest within the bottom of the housing from whence it can be conveniently collected and removed.

Connected to the manifold 28 by conduit 31 is a heating unit 32 and a blower fan 33. The fan 33 provides a flow of air which moves through the heating unit where a gas fed flame raises its temperature to a desired level. Thereafter the hot air travels through the conduit 31 and is introduced uniformly along the length of the drier by the manifold 28 and nozzle 29. A gas feed valve 34 on the heating unit 32 controls the rate at which gas is supplied thereto for combustion and thus the temperature of the air provided for drying purposes by the blower fan. In FIG. 1, an electrical servo-motor 35 is connected to valve 34 and controls the position thereof.

Spiral baffles 27 move the cotton to the exit point of drier 17 and into conduit 36, thence into a conventional inclined grid cleaner 37. As such cleaners are well known in the art, the details are not shown or described. It is sufficient to point out that the seed cotton is cleaned as it moves through the cleaner, and upon its exit therefrom it passes into the second drier 38. Air from drier 17 is discharged through exhaust duct 39. Where another type of drier, for instance, a tower drier, is used, the lower end of feed unit 13 may discharge into an inlet duct or pipe which extends, as is customary, upwardly to the top of the drier.

Our invention contemplates that the heat supply system for a second drier be controlled in either of two ways. In FIG. 4 we have disclosed an arrangement in which a single control unit is employed in conjunction with both driers. The moisture reading obtained prior to entry into the first drier is suitably communicated to both driers so as to reduce the moisture content to a desired level at the time of exit from the second drier. Alternate arrangements utilizing two moisture measuring elements and two separate control units to operate the two driers are shown in part in FIGS. 5 and 6 and will be described hereinafter.

Drier 38 is identical to drier 17 in FIG. 1, and either or both may be a so-called tower drier, which also is a conventional item of equipment. The parts associated with drier 38 including the blower fan, heater, valve and motor, conduit, manifold and nozzle, are substantially identical to their counterparts associated with drier 17, and the same reference numerals are employed with the suffix letter "a" serving to distinguish between the two.

It is to be understood that the fan and heating unit and their associated parts may be any of several conventional designs, such units being available by separate elements or integrated assemblies. The arrangement shown merely illustrates one type of assembly which will provide the heat necessary for proper drying, and our invention relates to the manner in which the fuel supply valve is controlled.

It is apparent that the location of the heating units relative to the drier is a matter of choice, and for purposes of compliance with various building codes or for minimization of fire hazards, they may be in a separate room remote from the drier itself. In other words, the conduits 31 and 31a may be of such length as is necessary to interconnect the heating units and driers. This and other variations in installation conditions produce the need for the wide range of flexibility provided in our invention.

One form of control which we employ in our invention is illustrated in FIGS. 3 and 4. It may be conveniently described in three parts, although it is to be understood that all parts with the exception of the measuring element and servo motors and their associated structure can be and preferably are housed in a small, conveniently located cabinet.

The first feature of the operation of the control is the moisture measuring element 21 therein. In broad terms, the D.C. resistance of the material being measured by this element, which varies inversely with its moisture content, is employed to control the voltage across the grid 40 of a vacuum tube 41. The power source 42 provides a fixed regulated voltage, which in our present embodiment is 75 volts, D.C. The negative pole 45 of a power source 42 is electrically connected through a variable resistance 46 and a fixed resistance 47 to a junction point 44. The moisture measuring element 21 also is connected to junction point 44 through its "hot" side, and its ground side may connect to the frame of the drier itself. When the combined resistances 46 and 47 are equal to the resistance across the moisture measuring element, the voltage at grid 40 of vacuum tube 41 is equal to one-half of the regulated supply voltage or 37.5 volts, positive with respect to the negative pole 45 of power source 42. A decrease in moisture content causes an increase in the resistance of the measuring element, and less current flows through resistances 46 and 47. This makes the voltage at the grid lower, i.e., less positive with respect to the negative pole 45. An increase in moisture content has the opposite effect.

The blade of selector switch 48 is shown in FIG. 3 to be in circuit with the junction point 44 through switch contact 49, which positioning represents the normal automatic operating condition. The alternate positions of switch 48 are to assist in the preheating of the drier and form the adjustment of the range of response of the control apparatus, and the description of the purposes and functions of the adjustment circuits will be set forth hereinafter.

From the foregoing, it is apparent that the voltage at the grid 40 varies in response to the moisture content of the material in measuring position against the moisture measuring element 21. The filament of vacuum tube 41 is in series with a resistance 51, while the plate of the tube is in series with a milliammeter 52, serving as an indicating meter, and a galvanometer 53 functioning as a control meter. In parallel connection with the galvanometer is a variable resistance 54 which may be identified as the "high-set" resistance. Thus, the amount of D.C. current which flows through circuit elements 52, 53, 54 is determined by the bias at grid 40, as determined by the moisture of the cotton.

Indicating meter 52 is calibrated in terms of percent moisture content over the anticipated moisture range. A milliammeter is a suitable instrument for this purpose. In our presently preferred embodiment, the full scale range of deflection of the meter is set to register from 6% to 18% moisture content. The face of this meter is located in the front side of the cabinet for the convenience of the operator. Increases in moisture cause upscale meter deflections and decreases in moisture cause downscale deflections. Cathode bias voltage is determined by by the voltage drop across the resistance unit 51, and thus the components of this unit are selected to meet the desired meter calibration range.

The "high set" resistance 54, which shunts meters 52 and 53, is to divert current from the path which includes the two meters, and it thus provides means for setting the full scale current.

The current flow through the shunt circuits just described is affected by a power source 55, which provides a relatively low D.C. voltage. With a 75 volt primary source, we have found that power source 55 should provide approximately nine volts. The current resulting from this voltage is controlled by variable resistance 56, which may be called the "low set" resistance. The procedure for the low set adjustment will be described subsequently herein.

The variations in the voltage on grid 40 may be considered the first phase of the operation of the control element. The variations in the current through the indicating meter 52 and control meter 53 in response thereto may be considered the second. The third phase is that governed by the control meter 53. Instrument 53, which receives and responds to the current through vacuum tube 41, is a standard galvanometer, the upper and lower limits of which are closely spaced. At the limit positions of the galvanometer needle, a small photocell 60 and 61 is positioned behind a hole in the galvanometer face plate. The width of the deflecting needle 62 is just sufficient to cover the holes, and thus cut off the light from a small lamp, not shown, which is positioned in front of the face plate. The mechanical limits of the needle deflection are spaced so as to permit the needle to occupy a position directly between photocells 60 and 61 without obstructing either. This is the condition which obtains when the current through the control meter is at a predetermined finite level.

Referring now to FIG. 4, each of the photocells 60 and 61 is connected in series with a fixed resistance, indicated respectively by reference numerals 63 and 64, and the series combination is connected directly to a 120 volt A.C. source 65. When the light on either photocell is obstructed by the needle 62, the electrical resistance of the cell so obstructed will increase significantly.

Gas control tubes 66 and 67 are connected individually in series with relays 68 and 69. Associated damping networks may be provided as dictated by the characteristics of the individual components. The junction between the photocell 60 and the resistance 63 is connected to the starter anode of the gas tube 66. Similarly, the junction between photocell 61 and resistance 64 is connected to the starter anode of tube 67. When the resistance of either photocell increases as a result of the deflection of needle 62, the A.C. voltage drop across it immediately exceeds the critical firing voltage of the associated gas tube, which in the illustrated embodiment is approximately 73 volts.

The gas control tubes perform much as half wave rectifiers, except that the condition is cut on or off by changing the relation of the starter voltage to cathode. When the light is blocked from the associated cell by its needle 62 so that the starter anode voltage with respect to the cathode is in excess of approximately 73 volts, the tubes will conduct on the positive half cycle and block the current on the negative half cycle, thus resulting a pulsating D.C. current through the associated relay. Thus, the relays 68 and 69 are closed by the firing of the gas tube associated therewith.

The manner in which the above described components control the heat supply element now becomes apparent. The control meter 53 will not cause either gas tube to fire and actuate its associated relay until the moisture content of the material in process changes and unbalances the circuit therethrough. Upon such a change, the relay affected thereby closes its switch contacts, indicated by reference numerals 68a and 68b and 69a and 69b, which causes the reversible valve motors 35 and 35a to rotate, either in a clockwise or counterclockwise direction. In the arrangement disclosed in FIG. 4, it may be assumed that the closing of contacts 68a and 68b produces clockwise rotation, and the closing of contacts 69a and 69b causes counterclockwise rotation. As the motors are connected to the fuel supply valve 34 by the mechanical linkage indicated generally by the reference numerals 70 and 70a, rotation of the motor adjusts the effective valve opening and the rate at which fuel is supplied for combustion.

Referring now to FIG. 3, connected directly to the shaft 71 of the motor 35 is the slider of a variable resistance 72 whereby the resistances selected by the slider arm will change in accordance with the position of shaft 71 over an arc which in our present unit is approximately 90°. The terminal voltage of resistance 72 is taken directly from the terminals of the resistance 74 which has a contact arm 75. The source of this voltage is the 9 volt D.C. power source 76. Variable resistances 72 and 74 thus form the arms of a bridge which may be balanced by the rotation of the fuel valve operating motor. The position of motor shaft 71 is thus related to the reading of the indicating meter 52, and the high and low limits, i.e., the range thereof, can be set by adjusting the position of arm 75 relative to resistance 74 and the value of resistance 77.

Having described the operation of the complete system, the functions of selector switch 48 and the various contacts associated therewith now may be considered. As indicated above, the foregoing description relates to the results which follow the positioning of switch 48 in the manner illustrated in FIG. 3, which has been identified as the automatic operation position. This operation will produce the desired results when the system has been properly calibrated in the manner now to be described.

Assuming that the normal mechanical adjustments have been made following installation of the unit, the selector switch 48 is moved to contact 80 to establish what may be identified as the "low set" position. As a result of this arrangement, the grid 40 of vacuum tube 41 is connected to the negative pole 45 of power source 42, and no fixed bias is provided on the grid. Thus, tube 41 will conduct some finite amount of current, and the net value of the current through the indicating meter 52 and the control meter 53 can be set by adjusting the resistance 56. The indicating meter is set to the low end of the scale in this manner.

Next, the selector switch is moved to contact 81, creating the "high set" condition, where the grid 40 is connected to ground potential to establish the maximum positive grid voltage with respect to negative pole 45 of power source 42. Adjustment of the resistance 54 can be made to move the indicating meter 52 to the high end of its scale.

Moving the selector switch to contact 82 connects grid 40 to the slider of a variable resistance 83 in parallel with moisture sensing element 21. The 75 volts D.C. from power source 42 is impressed across the terminals of resistor 83. Adjustment of resistance 83 simulates any desired reading by moisture measuring element 21, and an appropriate high limit reading, for example, 15%, can be set by observing the indicating meter 52. Then "high limit" resistance 74 can be adjusted by moving arm 75 to set the upper limit of instrument response. A lower limit of response is set by adjusting resistance 83 to simulate a convenient lower setting, for example, 7% moisture content. With this simulated moisture content placed in the circuit, the low limit resistance 77 can be adjusted to insure that the motor 35 does not close the valve 34 beyond a selected minimum opening.

The difference between the low limit moisture reading and the high limit moisture reading may be identified as the range of the instrument, for the control system will begin to function when the moisture level of the material reaches the former and will cease to function when the moisture level reaches the latter. In other words, if the above mentioned values have been set into the instrument, incoming material of a moisture of less than 7% will cause no additional closing of the gas supply valve beyond the preset minimum. Further, a moisture reading in excess of 15% would cause no further opening of the gas supply valve beyond its preset maximum.

It is apparent that in the particular circuitry shown a change of either the high limit or low limit resistance will affect any previous adjustments which have been made. If the difference between the high limit of 15% and the low limit of 7% is identified as the range of the instrument, which in the present example is 8%, any adjustment of the high limit control either upscale or downscale will move the entire range but not alter it.

The low limit control acts as a spread on the range. To illustrate, if the low limit were increased from 7% to 8% by an appropriate adjustment of resistance 74, this would have the result of decreasing the high limit position by an equal amount or 1%. Thus, the spread would be effectively reduced to the difference between 14% and 8% or 6%. This result renders adjustment of the control system more convenient, but readily apparent changes in the circuit will render the two controls independent of each other if the above described interrelation of function is not desired.

The contact 84 places the variable resistance 85 in circuit with grid 40, and this position, known as the manual setting, affords a convenient means for preheating the driers. For example, before any cotton is introduced into the chamber 14 it may be desired to establish the temperature within the driers at an elevated level. This can be done by moving switch 48 to contact 84 and setting resistance 85 to accomplish the desired result.

The electrical readjustments hereinabove described may be coordinated with the adjustment of the mechanical linkage 70 between the servo motor 35 and gas supply valve 34. In a given installation it well may be that the valve opening at the high limit position will need to be but ¾ of full opening. It also may be that for some installations, the minimum valve opening will be something greater than that needed to maintain a pilot flame. The adjustment of these values will depend upon the needs of a particular situation.

FIG. 7 depicts an alternative control system which is similar in some respects to that of FIGS. 3 and 4, but employs an electro-pneumatic transducer and an air operated valve in lieu of the photoelectric meter arrangement with its associated gas control tubes and relays and motor operated valve. The discussion of the control circuit of FIGS. 3 and 4 was subdivided into three parts, the first of which related to the operation of the moisture measuring element 21. This portion of the circuit is common to FIG. 7, and identical reference numerals are employed.

It will be recalled that the voltage at the grid 40 of vacuum tube 41 varies in response to the moisture content of the material in measuring position relative to the element 21. Thus, the voltage drop across the cathode bias resistance 51 will be proportional to the moisture in the cotton. Beyond this point, the circuit of FIG. 7 differs from that of the first described form.

A portion of the cathode bias voltage across resistor 51 is selected from the variable resistance or potentiometer 111 which is in parallel with resistor 51. This variable resistance functions as the "high set" control, as will be described subsequently herein. Such selected voltage is applied to the grid 112 of a second vacuum tube 113, the current through which flows from the negative terminal 45 of power source 42 through a variable resistance 114 which is the "low set" control, the tube itself, the moisture indicating milliammeter 115, and variable resistance 116 in parallel with the milliammeter, and thence through the parallel combination of variable resistance 117, the coil 118 of an electro-pneumatic transducer, and the variable resistance 119 and direct current power source 120. The resistance 117 functions as the "high limit" control and the resistance 119 as the "low limit" control. Thus, they are the general functional equivalents of resistances 74 and 77 of FIG. 3, as will be made apparent. The voltage at grid 112 increases with the voltage drop across resistance 51, and as has been noted, this value is proportional to the moisture content of the cotton. Thus, the current passing through vacuum tube 113 and coil 118 will vary in direct proportion to the moisture measurement of the element 21.

The current through the coil 118 varies the output air pressure of the electro-pneumatic transducer 121 of which such coil forms a part. This element, shown schematically in FIG. 7, is a conventional device which forms no part of the present invention except as a part of the control circuit. We presently prefer to use a unit of the type manufactured by the Fisher Governor Company and identified as its type 543 electro-pneumatic transducer. Basically, this unit reduces an input pressure of 20 p.s.i. to a range of from 3 to 15 p.s.i. in accordance with the strength of the coil current over a range of 4 or 5 milliamperes. The output air pressure is communicated to the pneumatic valve 122 also shown schematically in FIG. 7. As with the transducer, such valves are manufactured by the Fisher Governor Company, and the details are fully disclosed in the publication of such company identified as Bulletin E–57B. The valve identified as Model No. 511 is suitable for use in our invention as it varies in opening in response to a range of pressure matching that of the transducer. Thus, by installing valve 122 in the gas supply conduit in lieu of valve 34 in FIG. 4, the heat output of the heating unit 32 may be controlled.

The control circuit of FIG. 7 includes the selector switch 48 and the appropriate contacts described in connection with FIG. 3. When the selector switch is in the "low set" position (contact 80), variable resistance 114 may be set to reduce the current through the transducer coil to its lowest value with the input resistance infinitely high. When the selector switch is placed in the high set position (contact 81), resistance 111 is adjusted to create maximum transducer coil current when the input resistance is zero. The values of the current through indicating meter 115 may be read thereon in terms of percentage moisture content if desired, just as on the meter 52 in FIG. 3.

When the selector switch is moved to contact 82 and resistance 83 is adjusted to simulate any desired moisture reading, the variable resistance 117 in parallel with the transducer coil 118 shunts the current around the transducer coil so that the current flow through the coil necessary to create the fully open condition of the valve may be adjusted to occur at any desired moisture reading, as for example, 15%. This adjustment has been identified previously herein as the high limit control.

The variable resistance 119 in series with the power source 120 is employed to set the current through coil 118 at some finite value to result in a corresponding minimum opening of the valve when the moisture content is at or below any selected low limit. This, of course, is the low limit adjustment.

The above described circuit possesses certain advantages over that of the circuit of FIG. 3. However, it is apparent that it is characterized by the same flexibility to enable it to meet the widely varying demands occasioned by differing installations.

We have found two types of moisture measuring elements to be uniquely adapted for the purposes described herein. Each may be readily added to existing equipment, has no slip rings or other moving parts to detract from its accuracy or cause variations in reaction over its life, and does not rely on auxiliary mechanical means to press the moist material into measuring contact with the grid. Each also is economical to manufacture and may be connected to the control unit by a single lead wire. FIGS. 8 and 9 disclose the details of these elements.

In FIG. 8, the measuring element is mounted upon a bracket support, or slide 130 which is attached to and projects downwardly and inwardly from the internal wall of the control feed unit 13 and extends to a point immediately above the feed rollers 15, as suggested in FIG. 2. On the support or slide 130 is an electrode forming, metallic conductive plate 131, in the position of sensing element 21 of FIG. 2, which is separated from the bracket by a base plate 132 of insulating material. Both plates are secured to the bracket by insulating means such as nylon screws or bolts as indicated generally by reference numeral 133. An electrical terminal connection 134 insulated from bracket 130 by insulating bushing 135 allows connection of the plate 131 to the control system of FIG. 3 or FIG. 7, and as indicated previously herein, the support 130 is connected to ground and constitutes a second electrode. With this arrangement, the plate 131 represents the negative side of the element, and the support is positive. Material moving thereacross will complete the circuit between the plate and the bracket.

A second and equally suitable moisture measuring element is shown in FIG. 9. Here, somewhat as before, a support bracket or ledge 136 is connected to the internal wall of the control feed unit 13. The bracket is of substantial length so as to extend across a substantial portion of the opening through which cotton passes immediately prior to its passage through the feed rollers 15. Mounted upon the bracket is a series of elongated fingers 137 of approximately equal length, and spaced on centers of approximately one inch. As before, the bracket is so designed to place the fingers as close as possible to the point of entry of the cotton into the feed rollers.

The fingers 137 are divided into two groups, the members of which alternate in occurrence along the length of bracket 136. Fingers of the first group are attached directly to the bracket, and thus establish a connection to ground. The remaining fingers, located one between each pair of ground fingers, are insulated from the bracket by an insulating bushing 138, which is of a material having high insulating qualities. These insulated fingers are electrically connected by the lead wires 139, which in turn are joined to the single lead 141 going to the control circuit of FIG. 3 or FIG. 7.

Obviously, the spacing of the fingers is chosen to allow the individual locks of seed cotton to bridge thereacross. In this manner they can complete the circuit from the hot fingers to ground and produce a condition of varying resistance corresponding to moisture content.

It is contemplated that wholly satisfactory results can be obtained in any given installation with a single control element and one or more valves as described above. Where two automatically controlled valves are employed, it is preferable that the temperature of the second be somewhat less than that of the first. Thus, the signal which would place the first valve in a full open position ideally would place the second valve in some intermediate position less than fully open. This proportioning of the two valves can be accomplished by adjustment of the linkage connecting the motors to the valves, by adjustment of the electrical components of the control circuit, or in any of several other readily apparent ways.

Despite the flexibility of the apparatus already disclosed, there are certain installations which ordinarily would require two separate control units. An example of such need would be a plant in which all of the incoming material had not been harvested in the same way. Cotton can be hand-picked, machine-picked, pulled or machine-stripped. Machine-picked cotton normally has considerably more trash than the hand-picked variety, and the pulled and machine-stripped cotton each would display considerable variation in the amount of sticks, bolls and foreign matter contained therein. A change from one type of cotton to another would create a substantially different result in the reading of a resistance measuring device, for the moisture sensing element would determine the moisture content of any material passing thereby, and trash, bolls and other foreign matter would affect such readings.

To overcome the inconvenience of recalibrating the entire system upon each change of entering material, two independent sensing elements can be used to advantage. The intermediate cleaning process between the first and second driers results in removal of a large amount of the extraneous matter which would affect the initial moisture measurements, and through a process of partial moisture removal followed by cleaning and a new measurement of the clean and partially dry cotton, the drying action of the second drier can be set with high accuracy. An independent control for the second drier also would reduce the precision of calibration required by a single sensing element, for the sensing element associated with the second drier can overcome slight errors arising from treatment in the first drier.

Additional structure necessitated by a dual independent assembly is shown in FIG. 5. As discussed previously herein, the proper operation of the moisture measuring element requires a continuous supply of slowly moving cotton which is about to enter the drier. FIG. 5 discloses the apparatus which controls the entry of cotton into a second drier 89 having its own measuring and control system and an indicating meter with a range of, for example, 4% to 10%. The arrangement of parts is quite similar to that of the first drier, there being a collecting chamber 90 into which the cotton is introduced following its exit from the cleaner. The moisture measuring element 91 of the design shown in FIG. 8 is located therein, and feed rollers 92 control the rate at which the material is fed to the drier. The rotation of the feed rollers is governed by the variable speed electric motor 93 which drives the rollers through the chain or belt 94.

Near the upper part of the chamber 90 is the valve member 95 which is similar in action to the valve member 18 in FIG. 2. However, the switch 96 operated thereby increases the speed of motor 93 by a predetermined amount when it is closed by the lifting of member 95. Thus, when the material within chamber 90 reaches its upper level, the feed rollers are accelerated to feed cotton more rapidly into the drier therebelow, but when the cotton has dropped to its lower level, the switch 96 opens and motor 93 and rollers 92 return to their normal rate of rotation.

The control unit and motor control valve indicated generally by reference numerals 97 and 98 respectively are as previously described. However, as they are connected to an independent sensing element within the second drier, the range of the magnitude of response would be independently set to serve the needs of the installtion. In a dual installation, both control circuits can be placed within a single cabinet for greater convenience.

In an installation in which the speed of the control feed units of both the first and second driers are controlled together and are operated at the same rate, the arrangement described above will function quite satisfactorily, for the initial drying and cleaning operations will have fluffed the cotton and increased its volume a sufficient amount to insure a supply in reservoir 90 at all times.

It is not essential that the arrangement of FIG. 5 be employed in a second drier. We have found that either of two alternate arrangements will function satisfactorily. In FIG. 6, for example, the conduit 101 which is connected to the inlet of drier 100 is inclined so that the cotton does not fall vertically but slides down the lower side thereof. Spaced therealong is a series of measuring elements 102 similar in design to the element of FIG. 8. The elements 102 are electrically connected in parallel so that the variations in the combined resistances thereof will provide a satisfactory although somewhat less accurate means for measuring the moisture content of the material. The parallel connected elements 102 of FIG. 6 are connected into the circuits shown in FIG. 3 in place of element 21. The control unit 103 responds to the variations in resistance thereof and adjusts motor control valve 104 in accordance therewith.

A second solution to this problem is illustrated in FIG. 10. It involves the use of the measuring element of FIG. 9 and a roller 140 mounted adjacent thereto in such manner as to throw the moving cotton against the fingers 137. This would satisfactorily fulfill the requirement that the cotton be placed in measuring position relative to and bears substantially uniformly against the moisture measuring element immediately prior to its entry into the drier.

As mentioned previously herein, our invention is not limited to reel type driers, for so-called tower driers readily could be substituted therefor. Other obvious changes will occur to one skilled in the art, for which reason it is desired that the scope of our invention be determined by reference to the following claims.

We claim:

1. Drying apparatus for seed cotton of the type having a drier casing with inlet and outlet ducts, means for conducting cotton through said casing, a heater for said casing and control means for said heater, a downwardly disposed feed duct with downwardly converging walls having a restricted portion for supplying seed cotton by gravity to said inlet duct, and means controlling the discharge of cotton from said feed duct to said inlet duct, the improvement comprising spaced electrodes fixed on the inner portion of one of said walls at substantially the most restricted portion of said feed duct in position to be continuously bridged by cotton pressed thereagainst in passing through said restricted portion, means for impressing an electrical potential across said electrodes and said bridging cotton, an electrical circuit including said electrodes, and a resistance measuring device in said circuit for sensing the moisture content of said bridging cotton, and means operatively connecting said resistance measuring means and said heater control for adjusting said heater according to the moisture content of the cotton being handled.

2. Seed cotton drying apparatus as described in claim 1 further including cotton feed control rollers substantially at the outlet of said feed duct and adjacent said casing inlet duct, said electrodes being immediately upstream of said rollers whereby said heater control responds to moisture conditions of cotton substantially as it enters said casing.

3. Seed cotton drying apparatus comprising a drier casing having inlet and outlet ducts, a heater for said casing and control means for said heater, a downwardly disposed feed duct for directing seed cotton by gravity into said inlet duct, spaced electrodes fixedly mounted on the wall of said feed duct adjacent the lower extremity thereof, baffle means projecting from the wall of said feed duct above said electrodes and a roller adjacent said electrodes, said baffle means and said roller both being disposed to continuously direct incoming cotton against and in electrical bridging relationship with said electrodes, an electrical circuit including said electrodes, a source of electrical potential and a resistance measuring device in said circuit, and means operatively connecting said measuring device and said heater control for adjusting said heater in accordance with the moisture content of cotton bridging said electrodes.

4. Seed cotton drying apparatus comprising a drier casing having inlet and outlet ducts, a heater for said casing and control means for said heater, a downwardly disposed feed duct for directing seed cotton by gravity into said inlet duct, spaced electrodes fixedly mounted on the wall of said feed duct adjacent the lower extremity thereof, a roller mounted in said feed duct adjacent said electrodes for continuously propelling substantial portions of the incoming cotton in said feed duct against and in current bridging relationship with said electrodes, an electrical circuit including said electrodes, a source of electrical potential and a resistance measuring device in said circuit, and means operatively connecting said measuring device and said heater control for adjusting said heater in accordance with the moisture content of cotton contacting said electrodes.

5. Seed cotton drying apparatus comprising a drier casing having inlet and outlet ducts, a heater for said casing and control means for said heater, a downwardly disposed feed duct for directing seed cotton by gravity into said inlet duct, spaced, electrical conducting fingers projecting inwardly from the lower part of the wall of said feed duct and insulated from each other, said fingers being positioned to be electrically bridged by cotton passing through said feed duct, roller means in said feed duct for forcefully directing substantial portions of the incoming cotton into current bridging relationship with said fingers, an electrical circuit including said fingers, a source of electrical potential and resistance measuring device in said circuit, and means operatively connecting said measuring device and said heater control for adjusting said heater in accordance with the moisture content of cotton contacting said fingers.

References Cited by the Examiner
UNITED STATES PATENTS

| | | | |
|---|---|---|---|
| 2,045,381 | 8/1931 | Elberty | 34—54 |
| 2,346,437 | 8/1939 | Krogh | 236—44 |
| 2,870,404 | 1/1959 | Oxley | 324—65 |
| 2,968,874 | 1/1961 | Fishburn | 34—48 |
| 2,999,676 | 9/1961 | Ewing | 263—19 |
| 3,111,298 | 11/1963 | Jones | 34—48 |

WILLIAM F. O'DEA, *Acting Primary Examiner.*

CHARLES SUKALO, *Examiner.*